United States Patent [19]

Crumbacher et al.

[11] Patent Number: 4,580,958

[45] Date of Patent: Apr. 8, 1986

[54] TIRE LOADER AND BASKET

[75] Inventors: Thomas A. Crumbacher, Columbiana; Anand P. Singh, Youngstown; Gary R. Naylor, Canfield, all of Ohio

[73] Assignee: NRM Corporation, Columbiana, Ohio

[21] Appl. No.: 723,143

[22] Filed: Apr. 15, 1985

[51] Int. Cl.$^4$ .............................................. B29H 5/02
[52] U.S. Cl. ........................................ 425/38; 425/33; 425/34 R
[58] Field of Search ....................... 425/19, 20, 38, 47, 425/28 P

[56] References Cited

U.S. PATENT DOCUMENTS

| 2,923,527 | 2/1960 | Fannen | 425/19 X |
|---|---|---|---|
| 3,065,503 | 11/1962 | Mallory et al. | 425/38 |
| 3,130,446 | 4/1964 | Duerksen | 425/20 |
| 3,167,810 | 2/1965 | Soderquist | 425/38 X |
| 3,233,284 | 2/1966 | MacMillan | 425/19 |
| 3,337,918 | 8/1967 | Pacciarini et al. | 425/38 X |
| 3,380,115 | 4/1968 | Soderquist | 425/38 |
| 3,564,649 | 2/1971 | Soderquist | 425/38 X |
| 3,741,696 | 6/1973 | Greenwood | 425/47 |
| 3,936,251 | 2/1976 | Billey | 425/38 |
| 4,092,090 | 5/1978 | Yuhos et al. | 425/28 P |
| 4,105,379 | 8/1978 | Gaquit | 425/38 X |
| 4,169,698 | 10/1979 | Turk et al. | 425/38 X |
| 4,170,442 | 10/1979 | Singh | 425/38 |
| 4,190,406 | 2/1980 | Geck et al. | 425/38 |
| 4,279,438 | 7/1981 | Singh | 425/38 X |
| 4,338,069 | 7/1982 | Singh et al. | 425/38 |
| 4,391,769 | 7/1983 | Ichikawa et al. | 425/38 X |
| 4,401,422 | 8/1983 | Amano et al. | 425/38 |

Primary Examiner—J. Howard Flint, Jr.
Attorney, Agent, or Firm—Renner, Otto, Boisselle & Lyon

[57] ABSTRACT

A loader for a tire curing press comprising a support, a loader frame mounted to the support for vertical and horizontal movement, a loader basket mounted to the loader frame for engaging, holding and releasing a tire, a first actuator for vertically moving the loader frame, a second actuator for horizontally moving the loader frame into and out of the press when open, and a mechanical guide for guiding the loader frame from an over-center position in the press to a center position as the loader frame is moved vertically in the press. The loader frame is supported on a spline shaft for movement therealong and rotation therewith by ball bushings riding in the grooves of the spline split. The loader basket comprises a plurality of generally radially movable shoes, an adjustable stop for limiting radial movement of each shoe and an adjustment mechanism for simultaneously and uniformly adjusting the adjustable stops.

20 Claims, 5 Drawing Figures

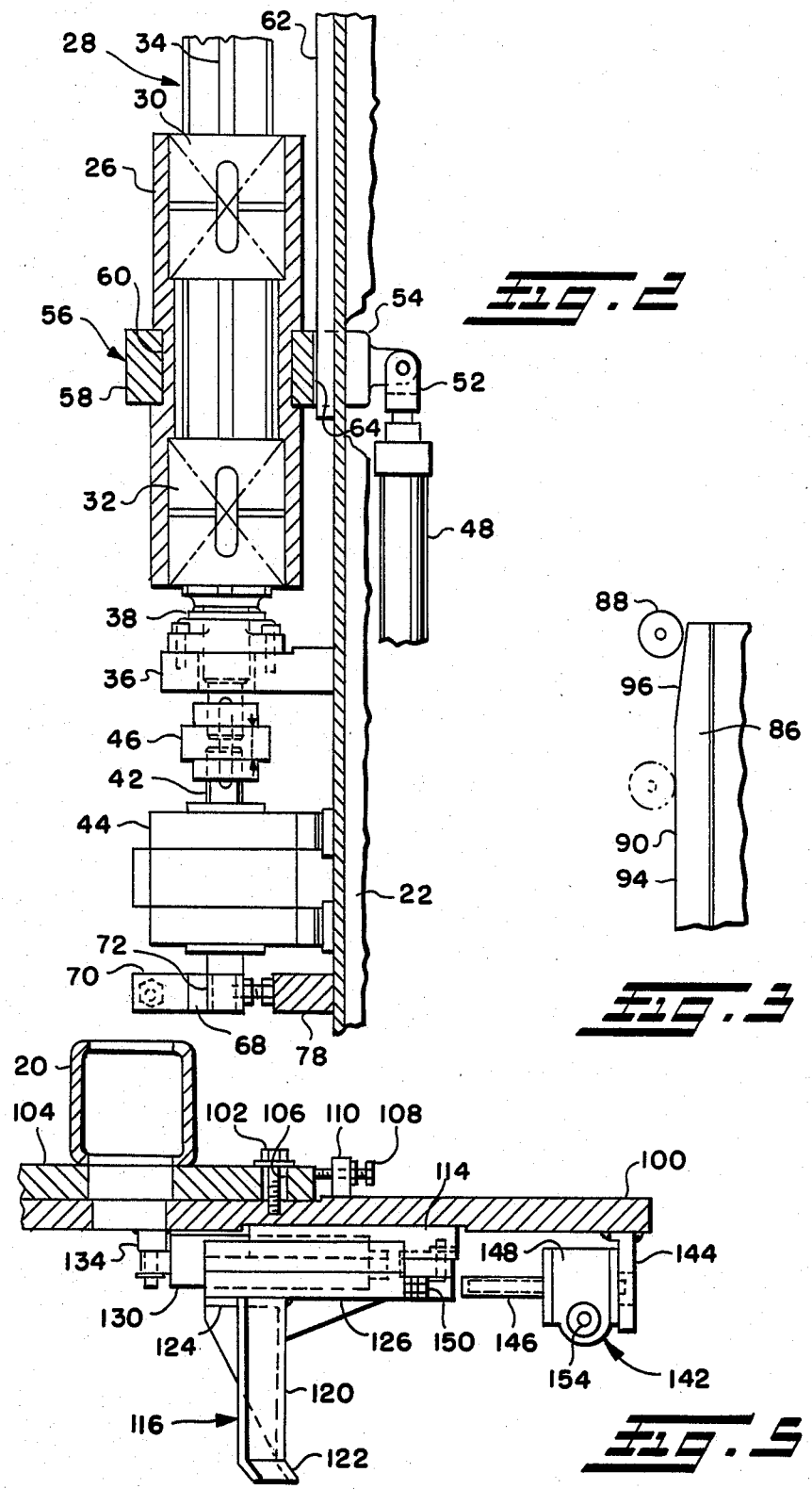

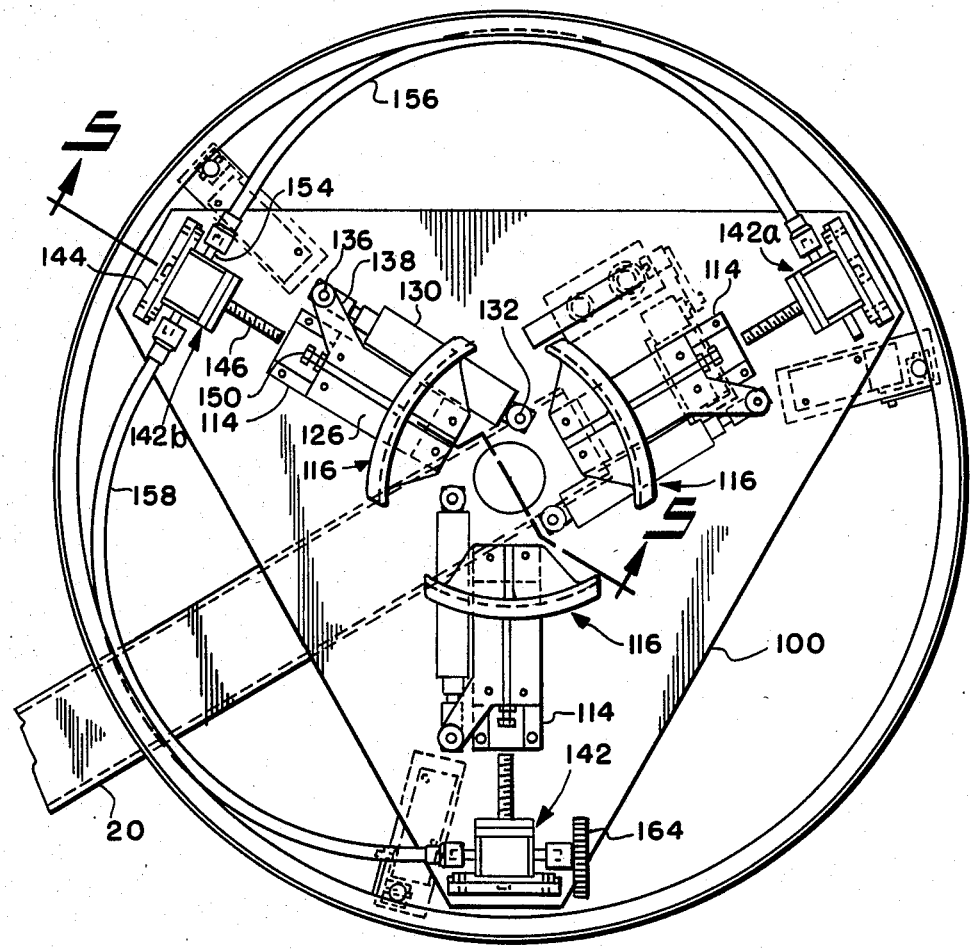

TIRE LOADER AND BASKET

The invention herein disclosed relates generally to a tire loader and basket and more particularly to a tire loader and basket for use with tire machinery such as tire curing presses.

BACKGROUND

Tire loaders have been widely employed in connection with automated tire machinery such as tire curing presses. Over the years such tire loaders have had a variety of different structural features depending upon the operational parameters involved such as the type of press and the type of tire being loaded. Since the advent of radial tires an important concern has been the need for the tire loader to locate very accurately the tire at the center of the press. Many prior art tire loaders simply could not attain the desired degree of precision and/or required difficult and time consuming adjustments.

Some prior art tire loaders have employed a horizontally swinging loader arm on which a loader basket or chuck was carried for horizontal movement into and out of the press. Loader baskets or chucks have included a circumferential arrangement of radially movable shoes which were expanded to engage and hold the upper bead of the tire. Loader arms also have been movable vertically to pick up a tire held by the loader basket from say a loader or conveyor in front of the press and later to lower the tire in the press. For precision centering, not only must the loader shoes be concentric with the center axis of the loader basket but such center axis must be accurately located at the center of the mold cavity by the loader arm. This is generally true for other types of tire loaders as well.

One problem associated with known tire loaders has been the inability or difficulty in maintaining concentricity of the loader shoes with the center axis of the loader basket over the entire range of bead size adjustment. It is noted that most loaders are designed to service a number of different tire bead sizes. Another problem has been difficulty in obtaining and maintaining accurate alignmnt of the center axis of the loader basket with the center of the mold cavity particularly during vertical movement of the loader basket in the press as may be needed for controlled transfer of the tire to the press.

SUMMARY OF THE INVENTION

The present invention provides a tire loader and basket for accurately loading tires into tire machinery and especially a tire curing press. The invention also provides for easy and quick adjustment of the loader basket for use with tires of different bead sizes while maintaining the concentricity of the loader shoes over the entire range of bead size adjustment.

According to one aspect of the invention, a loader for a tire curing press comprises a support, a loader frame mounted to the support for vertical and horizontal movement, a loader basket mounted to the loader frame for engaging, holding and releasing a tire, a first actuator for vertically moving the loader frame, a second actuator for horizontally moving the loader frame into and out of the press when open, and a mechanical guide for guiding the loader frame from an over-center position in the press to a center position as the loader frame is moved vertically in the press. More particularly, the mechanical guide includes on opposite ones of the loader frame and support a vertical guide track and track follower which are maintained in engagement by the second actuator as the loader frame is moved vertically in the press by the first actuator. The vertical track has a taper at one end for guiding the loader frame from such over-center position to a center position and a vertical guide surface for maintaining the loader frame at such center position during vertical travel in the press.

According to another aspect of the invention, a tire loader comprises a support, a spline shaft journaled to the support and a loader frame supported on the spline shaft for movement therealong by ball bushings riding in the grooves of the spline shaft. The ball bushings are keyed to the loader frame and a rotary actuator is provided to rotate the spline shaft about its axis for swinging the loader frame between tire pickup and load positions.

According to still another aspect of the invention, a loader basket comprises a plurality of generally radially movable shoes, an adjustable stop for each shoe and an adjustment mechanism for simultaneously adjusting the adjustable stops. More particularly, worm gear jacks are used as adjustable stops for the radially movable shoes and the worm gear jacks are serially connected by flexible cables for single point and uniform adjustment of the worm gear jacks.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 2 is an enlarged fragmentary vertical section, partly broken away, of the loader assembly taken substantially along the line 2—2 of FIG 1;

FIG. 3 is an enlarged fragmentary elevational view of the loader assembly looking generally in the direction of the arrows 3—3 of FIG. 1;

FIG. 4 is a bottom plan view of a loader basket assembly according to the invention; and FIG. 5 is a slightly enlarged fragmentary vertical section through the loader basket assembly taken substantially along the line 5—5 of FIG. 4.

DETAILED DESCRIPTION

Figure 1:
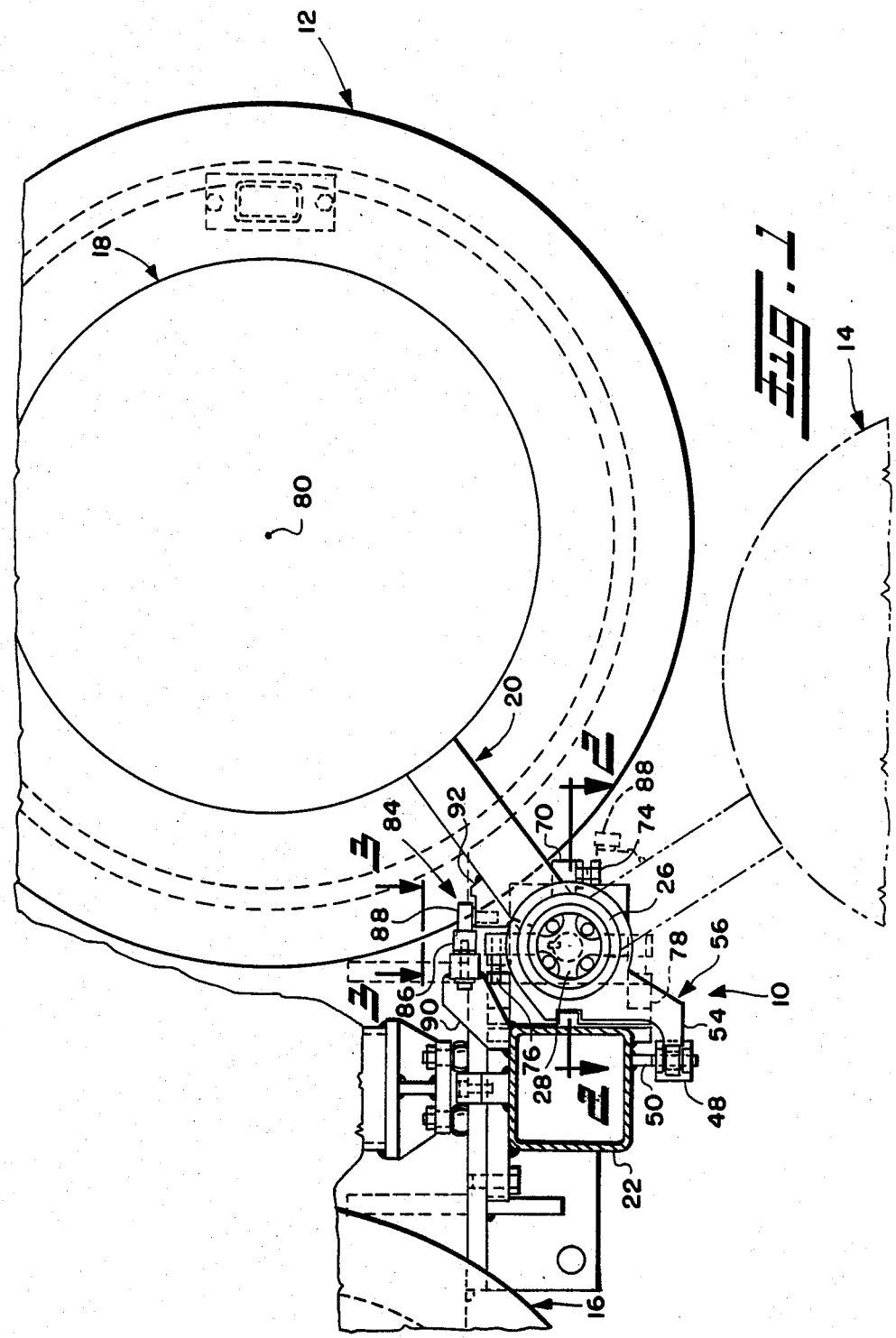
FIG. 1 is a fragmentary horizontal section through a tire loader assembly according to the invention.

In FIG. 1, a tire loader assembly according to the invention is designated generally by reference numeral 10. The loader assembly 10 is particularly suited for loading a green tire into a mold cavity 12 of a tire curing press from a pick-up position 14 in front of the press. The press may be of a dual cavity type and usually a second similar loader assembly will be provided to load green tires into the other mold cavity partly shown at 16. The second loader assembly is not shown but essentially would be a mirror image of the loader assembly 10.

The loader assembly 10 may be of the swing-arm type and, as shown, includes a loader basket assembly 18 (FIGS. 3 and 4) which depends from the distal end of a loader arm or frame 20. The loader arm 20 is mounted on an upright loader stanchion or column 22 for vertical and horizontal swinging movement as more fully described below. For a dual cavity press the loader stanchion 22 preferably is located centrally between but towards the front of the mold cavities 12 and 16 as shown. Accordingly, the loader assemblies for both mold cavities of the press can share a single common loader stanchion to which the loader arms of such assemblies may be mounted generally at respective sides of the loader stanchion in the manner illustrated and hereinafter described.

With additional reference to FIG. 2, the loader arm 20 is supported in cantilever-like fashion from a vertically extending tube 26. The tube 26, preferably cylindrical, is mounted for vertical movement on a vertical spline shaft 28 by vertically spaced top and bottom ball bushings 30 and 32. The races of the top and bottom ball bushings are fixed in corresponding ends of the tube, and the balls of each bushing ride in respective vertical grooves formed between the splines 34 of the shaft 28. Accordingly the tube is keyed against rotation relative to the shaft but movable along the vertical axis of the shaft.

The spline shaft 28 is journaled top and bottom between brackets on the loader stanchion 22. As seen in FIG. 2, the bottom bracket 36 has mounted thereto a bearing 38 in which the lower end of the shaft 28 can turn. A similar journal mount may be provided at the upper end of the spline shaft.

The lower end of the spline shaft 28 projects beneath the bottom bracket 36 and is coupled to the shaft 42 of a rotary actuator 44 by a keyed coupling 46. Accordingly, operation of the rotary actuator 44 will turn the spline shaft about its axis which in turn will correspondingly swing the loader arm 20 horizontally.

Vertical movement of the loader arm 20 is effected by a vertical piston-cylinder assembly 48 which has its blind end pivotally connected to a bracket 50 on the loader stanchion 22. The rod end of the piston-cylinder assembly 48 is connected by a clevis 52 to a connecting arm 54 of a yoke 56. The yoke 56 at its collar portion 58 is axially retained in a groove 60 at the outer diameter of the loader arm tube 26 which can turn in the yoke. To prevent side load on the piston-cylinder assembly 48, rotation of the yoke is precluded by a key 62 on the loader stanchion 22 which engages a key slot 64 in the yoke. The key 62 is vertically elongated to prevent rotation of the yoke over its range of vertical movement effected by extension and retraction of the piston-cylinder assembly 48. Although not shown, limit switches and/or stops may be provided to indicate or determine raised and lowered positions of the loader arm.

Respecting control of the extent of horizontal swinging movement of the loader arm 20 into and out of the mold cavity 12 and according to the illustrated preferred embodiment of the invention, the shaft 42 of the rotary acutator 44 is double-extended to provide for connection of a control collar 68 to the lower extended end of the actuator shaft 42. The control collar 68 has a pair of angularly offset arms 70 and 72 extending horizontally therefrom and each arm 70, 72 is provided with a respective adjustable stop 74, 76. Outward swinging movement of the loader arm relative to the mold cavity 12 is limited by engagement of the adjustable stop 74 against a stop plate 78 on the loader stanchion 22. The stop 74 may be adjusted properly to locate the loader basket 18 at its tire pick-up position 14 in front of the press. For example, a loader stand for green tires may be provided in front of the press and the stop 74 adjusted to assure that the axial centerline 80 of the loader basket 18 is within a close tolerance of the axial centerline of the loader stand.

When the loader arm 20 is swung into the mold cavity 12, such inward swinging movement is limited by engagement of the other adjustable stop 76 against the stop plate 78. According to the preferred embodiment of the invention, the adjustable stop 76 is adjusted to determine an over-center position of the loader arm and, more particularly, the loader basket 18 in relation to the axial centerline of the mold cavity 12. That is, the adjustable stop 76 is set so that the axial centerline 80 of the loader basket will pass through and beyond the axial centerline of the mold cavity as the loader basket is swung horizontally into the press.

From the over-center position determined by engagement of the adjustable stop 76 with the stop plate 78, final and precise centering of the loader basket 18 to the mold cavity 12 is effected by a mechanical guide 84 during vertical lowering of the loader basket in the press. The mechanical guide 84 includes a vertical guide track 86 and a track follower consisting of a roller 88. The guide track 86 is secured to a bracket 90 on the loader stanchion 22. On the other hand, the roller 88 is rotatably mounted on a stub shaft fixed to a bracket 92 on the loader arm 20. The roller 88 is radially positioned in relation to the swing axis 94 of the loader arm such that it will engage a vertically extending guide surface 90 (FIG. 3) of the guide track.

As seen in FIG. 3, the guide surface 90 has a lower straight portion 94 and a relatively shorter upper portion 96 that is tapered or inclined to the lower portion 94. The guide track is fixed to the loader stanchion 22 such that the lower straight portion 94 of the guide surface 90 is exactly parallel to the axial centerline of the mold cavity 12. As is preferred, the included angle formed between the vertical plane of the lower guide surface portion 94 and a vertical plane common to the loader arm swing axis 94 and the axial centerline of the mold cavity 12 is exactly equal the included angle formed between a vertical plane through the axis of the roller 88 and a vertical plane common to the loader arm swing axis 94 and the axial centerline of the loader basket 18. Also, the axial centerlines of the mold cavity 12 and loader basket 18 are equidistant from the swing axis 94 of the loader arm in the illustrated preferred embodiment.

Respecting preferred operation of the loader assembly as thus far described, initially the loader arm 20 will be swung outwardly to locate the loader basket 18 at its pick-up position 14 above a green tire positioned, for example, on a loader stand in front of the press. The actuator 48 may then be operated to lower the loader arm for pick-up of the green tire by the loader basket. With the green tire held by the loader basket, the loader arm is raised to an elevated position and then the rotary actuator 44 is operated to swing the loader arm horizontally into the then open mold cavity 12 as between vertically separated top and bottom mold sections. As the loader arm is swung into the press, it will pass through and beyond a center position to an over-center or beyond center position determined by engagement of the adjustable stop 76 with the stop plate 78. At such elevated and over-center position of the loader arm, the roller 88 of the mechanical guide 84 will be located such that the upper portion 96 of the guide surface 90 of the guide track 86 extends beneath the roller as seen in solid lines in FIG. 3. Also, the roller preferably has not yet engaged the guide track 86 so that inward swinging movement of the loader arm is halted by the adjustable stop 76 and not the guide track.

The actuator 48 may now be retracted to lower the loader arm 20 in the press and hence the loader basket 18 for controlled transfer of the tire to the press. For example, the loader basket may be thusly lowered to place the bottom bead of the therein held green tire on the toe ring of the bottom mold section.

During such lowering of the loader arm 20, the roller 88 will engage and ride on the guide surface 90 of the guide track 86. Initially the roller will ride on the tapered (inclined) upper portion 96 of the guide surface 90 which causes the loader arm to be urged from its overcenter position towards its center position in the press. As the roller passes onto the lower portion 94 of the guide surface, the loader arm will then thusly be located and maintained at its center position during further downtravel of the loader arm. During such lowering of the loader arm, the rotary actuator 44 remains operative to keep the roller in positive contact with the guide track. The guide track is precisely set such that with the roller engaged against the lower portion 94 of the guide surface, the axial centerline of the loader basket 18 will be precisely aligned with the axial centerline of the mold cavity 12.

In the foregoing manner, the mechanical guide 84 effects and maintains accurate alignment of the axial centerline of the loader basket 18 with the axial centerline of the mold cavity 12. Of course, precise centering of the green tire held by the loader basket to the mold cavity further requires the tire to be held concentric with the axial centerline of the loader basket. Respecting this latter requirement, FIGS. 4 and 5 show a preferred embodiment of a loader basket which provides for easy and quick adjustment for use with tires of different bead sizes while maintaining the concentricity of the loader shoes over the entire range of bead size adjustment.

As seen in FIGS. 4 and 5, the loader basket 18 includes a loader basket plate 100 mounted by fasteners 102 to the underside of a loader frame plate 104 at the distal end of the loader arm 20. The loader frame plate 104 is secured as by welding to the underside of the loader arm 20 and includes oversized bores 106 through which the fasteners 102 extend. Such oversized bores 106 permit adjustment of the centerline of the loader basket plate relative to the loader arm by jackscrews 108. The jackscrews 108 are threaded in blocks 110 at the top side of the loader basket plate and project inwardly therefrom to engage respective side edges of the mounting plate 104. Three such jackscrews may be provided in a triangular arrangement to provide for centerline adjustment of the loader basket plate. Once adjusted, the fasteners 102 may be tightened to hold securely the loader basket plate to the loader arm. As seen in FIG. 4, the loader basket plate and loader frame plate have centerbores coaxially aligned with an opening through the loader arm which may accommodate the center post of a press center mechanism when the loader basket is lowered in the press as aforedescribed.

The loader basket plate 100 may have the illustrated triangular shape with each corner of the triangle truncated as shown. Secured to the underside of the loader basket plate are three radially extending ball slides 114 which are circumferentially equally spaced apart at positions substantially in line with respective corners of the triangular basket plate. Associated with each ball slide 114 is a loader shoe 116, each of which is identical in form.

Each loader shoe 116 includes a vertically extending spine plate 120 which is slightly curved as seen in FIG. 4. Along its bottom edge, the spine plate 120 is bent outwardly slightly to form a lip 122 adapted to engage the upper bead of a tire. The curvature of the spine plate is determined by the range of tire sizes which may be accommodated by the loader basket. The top of the spine plate is secured at inwardly bent flanges 124 to the underside of a shoe carriage 126 restrained for radial movement in the ball slide 114. The ball slides preferably are of the type having a free-loading feature which can be tightened in the event of looseness in the shoe sliding motion.

Each shoe 116 is radially inwardly and outwardly movable by a respective piston-cylinder assembly 130 preferably of pneumatic type. Each piston-cylinder assembly 130 has its blind end connected at a respective pivot 132 to a respective connecting block 134 on the bottom side of the loader basket plate and its rod end pivotally connected at a respective pivot 136 to an arm 138 extending from the respective shoe carriage 126. Accordingly, retraction of the piston-cylinder assemblies 130 will radially retract the loader shoes while conversely, extension of the piston-cylinder assemblies will radially expand the loader shoes.

The outward travel of each loader shoe 116 is precisely limited by a respective worm gear jack 142. Each worm gear jack is mounted to a vertical plate 144 depending from the loader basket plate 100 at a respective truncated corner of the loader basket plate. The spindle 146 of the jack projects inwardly from the jack housing 148 in a radial direction aligned with an adjustment screw 150 threaded in the respective shoe carriage. When the piston-cylinder assembly 130 is extended, it is the adjustment screw 150 which engages the end of the jack spindle 146 to limit outward travel of the loader shoe. The loader shoes can be adjusted with respect to their corresponding worm gear jacks with the respective adjustment screws 150 so that the loader shoes will be concentric with the axial centerline of the loader basket plate when radially expanded against their respective worm gear jacks.

The double extended drive shafts 154 of the worm gear jacks 142 are serially connected by flexible cables 156 and 158 for single point and uniform adjustment of the worm gear jacks. As seen in FIG. 3, the flexible cable 156 couples the drive shaft of worm gear jack 142a to the drive shaft of worm gear jack 142b. The flexible cable 158 in turn couples the worm gear jack 142b to the worm jack 142c. Accordingly, rotation of the drive shaft of the worm gear jack 142c will effect simultaneous and uniform adjustment of the other two worm gear jacks 142b and 142a. In this manner, the loader basket may be easily and quickly adjusted for use with tires of different bead sizes while maintaining the concentricity of the loader shoes over the entire range of bead size adjustment. This is a marked improvement over prior loader basket designs which required numerous adjustments to be made and concentricity to be re-established for each tire bead size change.

The aforedescribed adjustment mechanism also lends itself to manual adjustment without the need for tools. To this end, a knob 164 is connected to the free end of the drive shaft of the worm gear jack 142c. Accordingly, the press attendant need only turn the knob by hand to adjust the loader basket to a different bead size. No longer must he waste time in finding a needed tool or tools to make required adjustments in the loader basket when the tires to be loaded have a differet bead size than those previously loaded by the loader assembly.

In view of the foregoing, the loader shoes 116 may be individually adjusted for concentricity with the axial centerline of the loader basket plate 100 and the axial centerline of the loader basket plate may be adjusted with respect to the loader frame 20. These adjustments, however, need only be done once notwithstanding use of the loader basket with tires of different bead sizes. For bead size change, only single point adjustment is needed and such may be accomplished without the use of tools while the concentricity of the loader shoes (i.e., concentricity when the loader shoes are expanded) is maintained over the entire range of bead size adjustment. Also, the loader assembly provides for accurate alignment of the axial centerline of the loader basket with the axial centerline of the mold cavity with the result being very accurate locating of the tire at the center of the press without requiring difficult and time consuming adjustments.

Although the invention has been shown and described with respect to a preferred embodiment, it is obvious that equivalent alterations and modifications will occur to others skilled in the art upon the reading and understanding of this specification. For example, modification may be made for top loading of a tire in a tire curing press as by inverting and repositioning the guide track so that a suitably configured loader basket moves from an over-center position to a center position as such loader basket is vertically raised in the press for controlled transfer of the tire to the top half of the press. The present invention includes all such equivalent alterations and modifications, and is limited only by the scope of the following claims.

We claim:

1. A tire loader in combination with a tire curing press, said press including a mold cavity having a center axis, and said loader including a support adjacent said mold cavity, tire engaging means for engaging and holding a tire, means for mounting said tire engaging means to said support for vertical and horizontal movement, first actuator means for vertically moving said tire engaging means through a range of vertical movement, second actuator means for horizontally moving said tire engaging means from a position outside of said press to a beyond center position in said press when open, and mechanical guide means for horizontally shifting said tire engaging mens from such beyond center position to a position centered in relation to the center axis of said cavity as said tire engaging means is moved vertically in said press by said first actuator means through a portion of such range of vertical movement.

2. A loader as set forth in claim 1, wherein said mechanical guide means is further operative to maintain said tire engaging means at such center position as said tire engaging means is moved vertically in said press by said first actuator means through another portion of such range of vertical movement.

3. A loader as set forth in claim 1, wherein said guide means includes a guide track fixed in relation to one of said tire engaging means and support and a track follower fixed in relation to the other of said tire engaging means and support.

4. A loader as set forth in claim 3, wherein said second actuator means operates to maintain said guide track and track follower in engagement as said tire engaging means is moved vertically in the press.

5. A loader as set forth in claim 3, wherein said guide track has a guide surface including a lower portion parallel to the center axis of the press and an inclined end portion initially engaged by the track follower for urging of the tire engaging means from such beyond center position to such center position.

6. A loader as set forth in claim 5, wherein said track follower is a roller mounted for rotation about an axis fixed in relation to said tire engaging means.

7. A loader as set forth in claim 3, wherein said means for mounting includes a loader frame mounted to said support for swinging movement about a vertical axis, and said tire engaging means includes a loader basket mounted to the distal end of said loader frame.

8. A loader as set forth in claim 7, wherein said guide track and track follower are horizontally offset from the vertical swing axis of said loader frame.

9. A loader as set forth in claim 7, further comprising means for adjusting said loader basket relative to said loader frame.

10. A loader as set forth in claim 3, further comprising adjustable mechanical stop means for limiting inward horizontal movement of said tire engaging means to such over-center position.

11. A tire transfer device for a tire curing press comprising a support, a spline shaft journaled to said support, said spline shaft including a plurality of axially extending splines and axially extending grooves formed between relatively adjacent splines, actuator means for turning said spline shaft about its axis, a transfer frame, means mounted to said transfer frame for engaging a tire, and means for mounting said transfer frame to said spline shaft for movement along the axis of said shaft, said means for mounting including ball bushing means riding in the grooves of said spline shaft to key said transfer frame against rotation relative to said shaft while permitting such movement of said transfer frame along the axis of said shaft.

12. A transfer device as set forth in claim 11, further comprising second actuator means for moving said transfer frame axially along said spline shaft.

13. A transfer device as set forth in claim 12, wherein said second actuator means is connected to a yoke journaled on said transfer frame, and further comprising means for preventing rotation of said yoke relative to said support while permitting movement of said yoke with said transfer frame axially along said spline shaft.

14. A tire engaging basket for a tire curing press transfer device comprising a support, a plurality of tire engaging shoes mounted to said support in a circumferential arrangement for generally radial movement, means for moving said shoes in outer and inner radial directions, a plurality of stops mounted to said support, means movable with each shoe from a position out of engagement with a respective stop and into engagement with such respective stop to limit movement of the respective shoe in one of such outer and inner radial directions, each stop being adjustable to vary the extent of movement of the respective shoe in said one of such outer and inner radial directions, and means for simultaneously adjusting said stops.

15. A basket as set forth in claim 14, wherein said adjustable stops are uniformly adjustable by said adjustment means.

16. A basket as set forth in claim 14, wherein said adjustment means includes flexible cable means for serially connecting said adjustable stops for single point and uniform adjustment.

17. A basket as set forth in claim 14, wherein each adjustable stop includes a worm gear jack.

18. A basket as set forth in claim 14, wherein said adjustment means is hand adjustable without the use of a tool.

19. A basket as set forth in claim 14, wherein said support includes a support plate and further comprising respective ball slides for mounting said shoes to said support plate for radial movement.

20. A basket as set forth in claim 14, wherein said adjustment means includes means serially connecting said adjustable stops for single point and uniform adjustment.

* * * * *